May 27, 1958 W. MASON 2,836,704
ARC WELDING MACHINE
Filed Oct. 8, 1956 3 Sheets-Sheet 1

INVENTOR.
WILLIAM MASON
BY
ATTORNEY

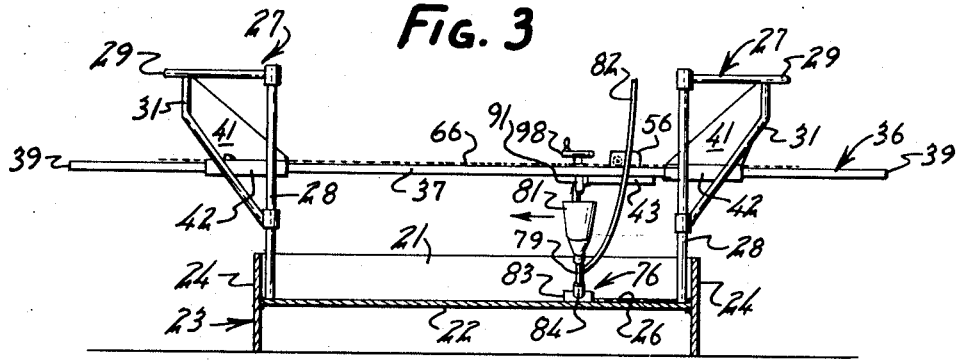
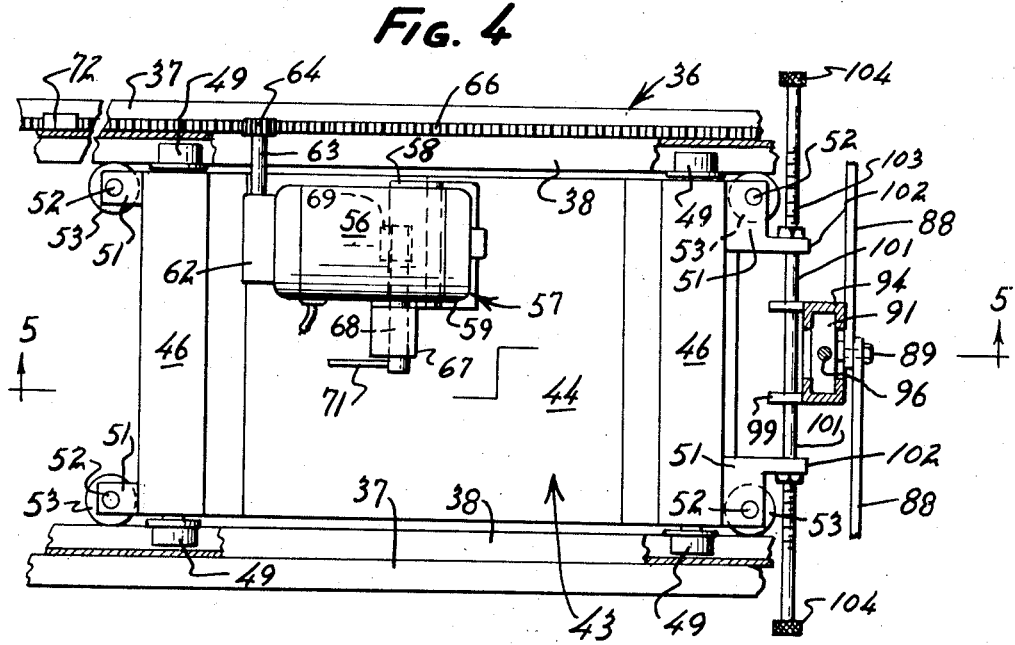
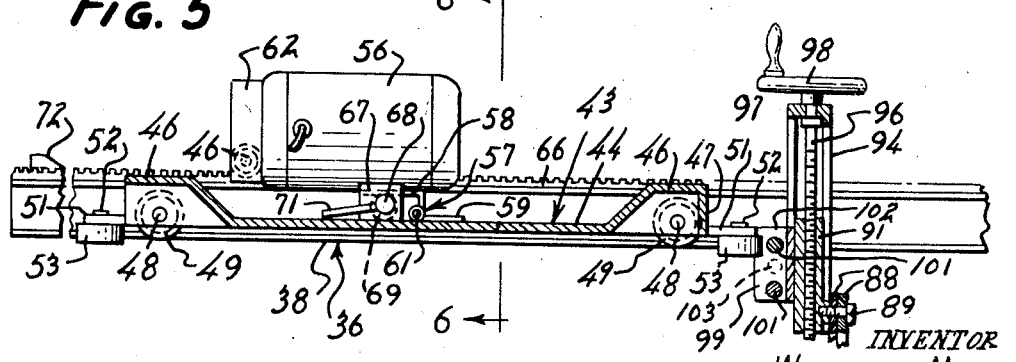

May 27, 1958 W. MASON 2,836,704
ARC WELDING MACHINE
Filed Oct. 8, 1956 3 Sheets-Sheet 3

INVENTOR.
WILLIAM MASON
BY Julian Caplan
ATTORNEY

United States Patent Office 2,836,704
Patented May 27, 1958

2,836,704

ARC WELDING MACHINE

William Mason, Oakland, Calif., assignor to Independent Iron Works, Inc., Oakland, Calif., a corporation of California Application October 8, 1956, Serial No. 614,498

5 Claims. (Cl. 219—125)

This invention relates to a new and improved machine for arc welding the opposite sides of a first piece of metal disposed at an angle with respect to a second piece. A typical application of the invention is in welding stiffeners to the web of a beam, extending between opposite flanges of the beam, but the invention has utility in a wide variety of other uses.

One of the objects of the present invention is the provision of a machine which will make repeated welds rapidly and with a minimum of labor, and yet which is adjustable to fit the requirements of individual jobs.

Still another feature of the invention is its inexpensive construction and the simplicity with which it operates.

The present invention comprises a machine having a horizontally disposed carriage support resting upon stands and a carriage movable along the carriage support from which are suspended two welding heads directed downwardly and inwardly to engage opposite surfaces of the stiffener to weld the same to the web of the beam. Considerable adjustability is afforded by the invention hereinafter described. For example, the spacing between the stands may be adjusted to accommodate beams of different widths. In addition, the vertical position of the welding heads relative to the carriage and the horizontal position of the welding heads relative to the carriage may likewise be separately adjusted.

The welding heads heretofore referred to comprise flux cones to hold and feed granular welding flux and also to provide a support for a welding rod and conventional guide therefor leading to a conventional welding machine.

A still further feature of the invention is the provision of a secondary carriage located in proximity to the structure heretofore described, which secondary carriage supports a pair of conventional welding machines which feed welding rod from a reel through the guide to the welding heads. The secondary carriage is so constructed that it may be installed for rolling movement along an I-beam.

Accordingly, the structure of the present invention provides a very versatile piece of equipment for performing two adjacent welds simultaneously wherein considerable adjustability in the position of the parts is afforded. Hence the present invention facilitates welding operations of a repeated nature, as commonly practiced in steel fabricating establishments, yet is transportable and adjustable for many different jobs.

Other objects of the present invention will become apparent upon reading the following specification and referring to the accompanying drawings in which similar characters of reference represent corresponding parts in each of the several views.

In the drawings:

Fig. 3 is a sectional view taken substantially along the line 3—3 of Fig. 1;

Fig. 4 is an enlarged top plan of the carriage partly broken away in section;

Fig. 5 is a sectional view taken substantially along the line 5—5 of Fig. 4;

Figure 1:
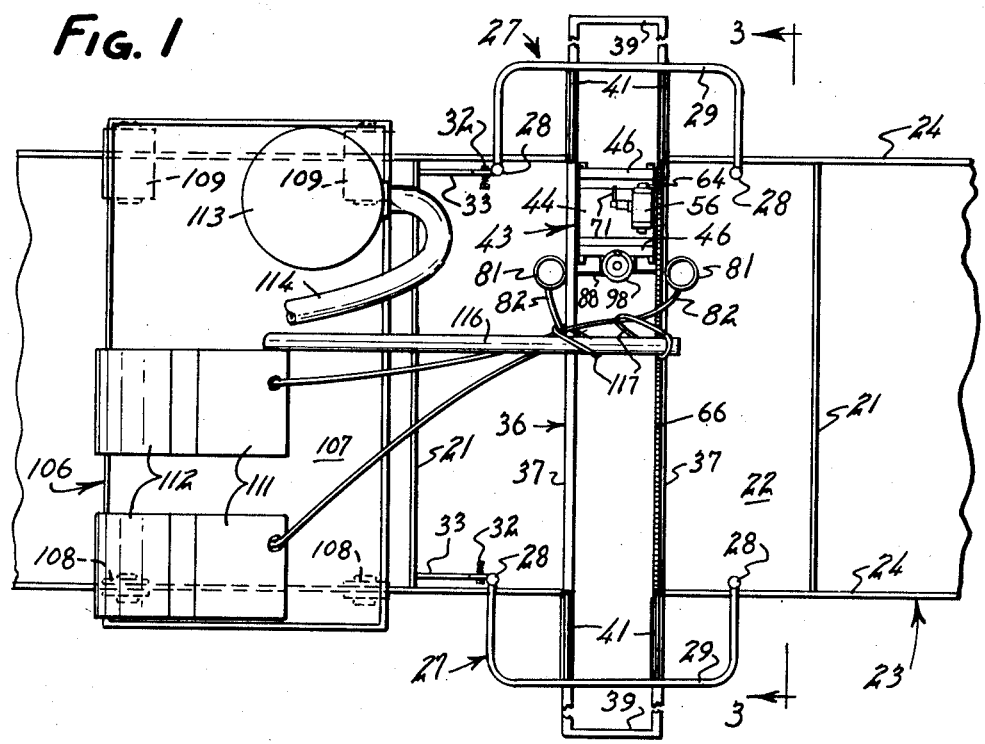
Fig. 1 is a top plan of the device installed on a horizontally disposed I-beam.
Figure 2:
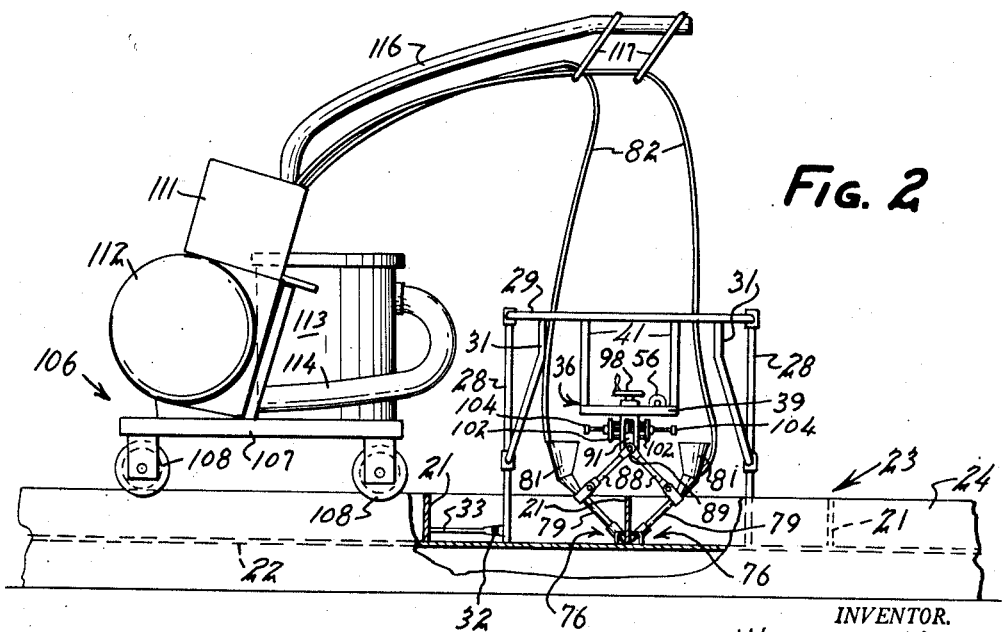
Fig. 2 is a side elevation.
Figure 6:
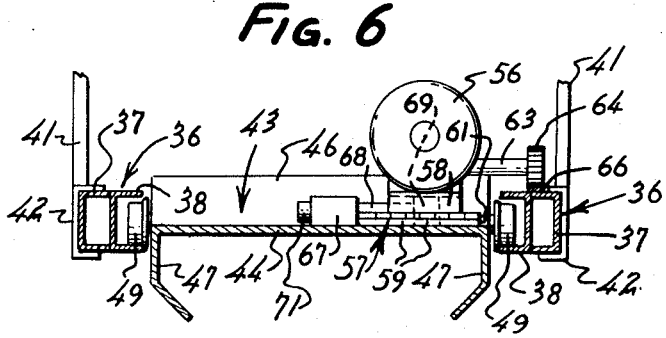
Fig. 6 is a sectional view taken along the line 6—6 of Fig. 5.

The welding machine which is the subject of this invention is adaptable to a variety of different uses. A particular use of the device is in welding stiffeners 21 to the web 22 of an I-beam 23. Such a stiffener 21 comprises a substantially rectangular piece of plate welded to the web of a beam intermediate the flanges 24 thereof. A pair of welds 26 is customarily formed at the juncture of the stiffeners 21 with web 22, the two welds 26 extending along the opposite surfaces of the stiffener. Prior to use of the present invention stiffener 21 is located in position and held therein by tack-welding or other means. In the description of the invention which follows, it will be understood that the machine is used to perform the foregoing-described welding operation, but it will be further understood that other uses of the machine will be apparent to those skilled in this art.

At the welding station a pair of stands 27 is positioned, each stand having its vertical legs 28 resting on web 22 adjacent one of the opposite flanges 24. Stand 27, in addition to legs 28, comprises hand-grip rail 29, which is arcuately bowed outwardly so as conveniently to be grasped by the workman, and struts 31 join the rail and legs in order to provide rigidity. One or more of legs 28 may be formed with an extending ear 32 adjacent its bottom to which is pivotally attached an adjustable guide 33 which can be used to locate the stand in proper position relative to the stiffener when repeated welds of substantially similar nature are being performed. Guide 33 is adjusted to proper length and by locating guide 33 in engagement with an adjacent stiffener 21, time is saved in insuring that the stand will be in proper position.

Supported by stands 27 at opposite ends is a horizontal carriage support 36. The carriage support comprises on either side a first and a second channel 37 and 38, respectively, each channel turned on its side and facing inwardly, and the edges of the flanges of the first or outer channel 37 being welded to the back of the base of the second or inner channel 38. At either end of carriage support 36 is a transversely extending spacer 39 which accurately locates the channels in proper parallel spaced relation. A bracket 41 attached at its upper end to stand 27 extends inwardly downwardly and terminates at its lower end in a C-shaped slideway 42 which fits around the outer channel 37 so as to suspend carriage support 36 in proper horizontal position and to permit movement of stands 27 relative to each other for different widths of beams 23.

Mounted for movement on carriage support 36 is a carriage 43 which has a downwardly dished central table 44 and raised ends 46. The side edges 47 of the carriage are turned downwardly along both sides and both ends. Extending transversely of the carriage at either end thereof is an axle 48 on the outer ends of which are mounted rollers 49 which fit inside inner channels 38 and roll on the inner surface of the bottom flanges thereof. On each of the four corners of carriage 43 is an ear 51 which extends longitudinally of the carriage, each ear being provided with a shaft 52 supporting a roller 53. Rollers 53 engage the inner edges of the bottom flanges of inner channels 38 and prevent sideward movement of carriage 43 as it moves along support 36.

A reversible, adjustable speed, direct current electric motor 56 is mounted on table 44. A preferred method of mounting comprises the use of a hinge 57, motor 56 being fixed to one leaf 58 thereof and the other leaf 59 being fixed to table 44. The hinge pin 61 extends horizontally transverse to the direction of movement of the carriage. Motor 56 is fitted with a reduction gear in housing 62. Drive shaft 63 extends outwardly from reduction gear housing 62 transverse to the direction of movement of the carriage and carries a pinion 64 on its outer end. Pinion 64 engages a rack 66 which extends longitudinally of one of outer channels 37. Thus as motor 56 turns, carriage 43 is caused to move along support 36. In order to disengage pinion 64 from rack 66 a bracket 67 is mounted on table 44 having a transversely extending cam shaft 68 carrying an eccentric cam 69 under the motor and a handle 71 at the outer end. By turning handle 71, the eccentric portion of cam 69 may be brought to rise leaf 58, which causes the motor to pivot around hinge pin 61 and raise pinion 64 from contact with rack 66, thereby stopping the movement of carriage 43. The position of carriage 43 relative to carriage support 36 may be changed while pinion 64 is thus disengaged from rack 66. Further, in order automatically to stop the movement of carriage 43 at the end of a weld 26, a wedge-shaped ramp 72 may be positioned over a portion of rack 66 at the point where the weld is to terminate. When pinion 64 reaches ramp 72, it is lifted, pivoting around hinge pin 61 as a center, thereby bringing pinion 64 out of contact with rack 66 and stopping movement.

Figure 7:
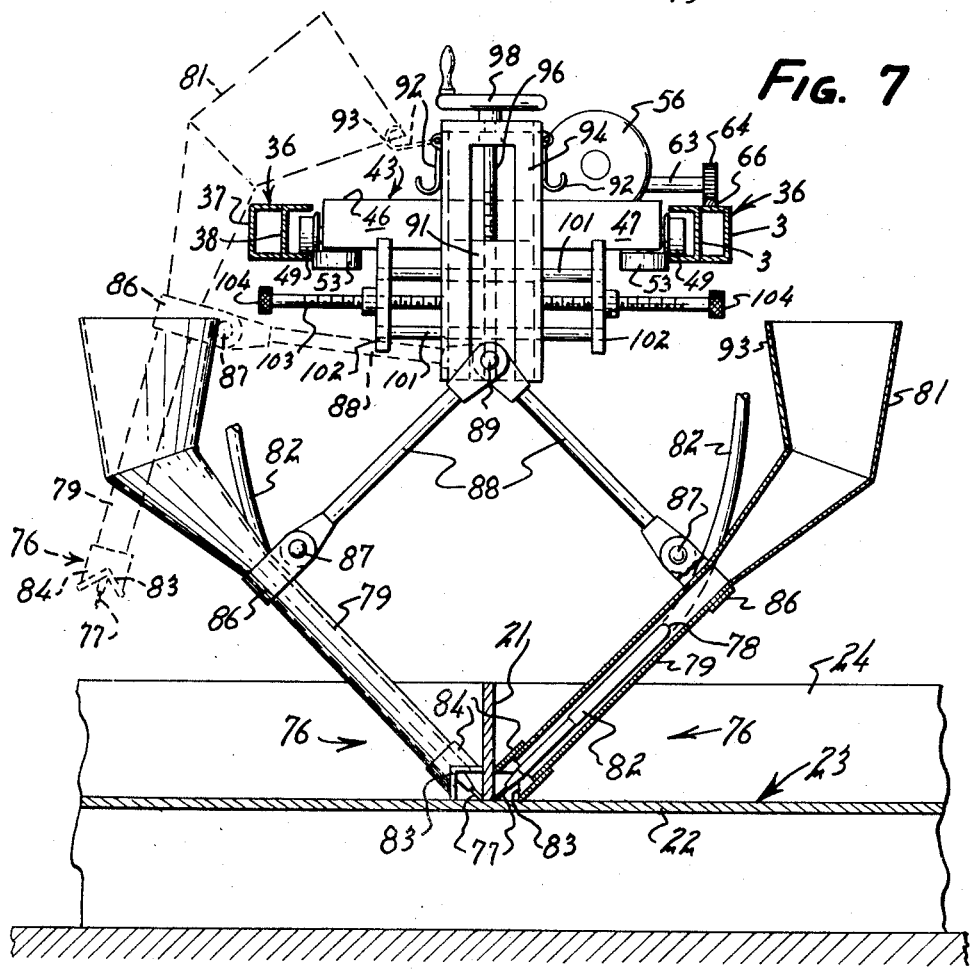
Fig. 7 is an enlarged end elevation partly broken away in section.

The function of carriage 43 is to support and move longitudinally a pair of welding heads 76 and associated parts longitudinally to form the welds 26. Reference is made to Landis Patent No. 2,536,294 wherein is illustrated and described one common type of arc-welding apparatus which may be employed in conjunction with the present invention. A long, flexible welding rod 77 terminates at each head 76 extending through a side opening 78 in a conical extension 79 at the bottom of a flux cone 81. Rod 77 for most of its length is enclosed in a long, flexible, tubular guide 82 which also carries an electric conductor (not shown) for the welding current. Welding rod 77 is fed through guide 82, as hereinafter explained and as more fully set forth in said Landis patent, and as rod 77 is consumed by the welding operation, it is automatically projected. Cone 81 feeds granular welding flux to weld 26 as is well understood in the art. A right-angle tip 83 is secured to a collar 84 on the end of conical extension 79. The bottom edge of tip 83 bears against web 22 and the other edge of tip 83 bears against stiffener 21, as best shown in Fig. 7. Hence as heads 76 are moved by carriage 44, as hereinafter set forth in greater detail, the end of welding rod 77 is properly positioned relative to weld 26. Heads 76 are positioned at each side of stiffener 21 so as to weld at both surfaces of the stiffener simultaneously.

Each head 76 is adjustably supported from the carriage. For such purpose a suspension collar 86 surrounds conical extension 79 and is attached by means of pivot 87 to rod 88, the upper end of which is attached by pivot 89 to a vertically slidable block 91. Hooks 92 on carriage 43 engage in holes 93 near the upper rim of cones 81 to hold tips 83 in an inoperative position when welding is not being performed. Block 91 slides in vertically disposed frame 94. In order to raise and lower block 91 there is provided a screw 96 which is threaded through block 91 and which is also journaled in a horizontal extension 97 of frame 94. Hand wheel 98 on the upper end of screw 96 is used to turn the screw and thereby to raise and lower block 91 in frame 94. Raising and lowering of the block raises and lowers heads 76 so that the ends of welding rods 77 may be properly positioned at the desired locations of the welds. Frame 94 has an inwardly extending C-shaped projection 99 which slides transversely on horizontal rods 101 transversely disposed between extensions 102 of ears 51 at one end of carriage 44. A horizontal, transverse adjustment screw 103 having knobs 104 at either end and likewise threaded through C-shaped projection 99 may be used to move frame 94 transversely horizontally in order to adjust the center of same directly over stiffener 21 to be welded. By turning hand wheel 98 and adjusting knobs 104, accurate positioning of tips 83 may be accomplished.

A secondary carriage 106 is placed in proximity to the location of welds 26. Such a secondary carriage comprises a platform 107 having a set of flanged wheels 108 which ride on one flange 24 of I-beam 23 and a pair of elongated rollers 109 which ride on the other flange 24. The secondary carriage 106 supports a pair of welding machines 111 having reels 112 of welding rod and gripping wheels (not shown) which feed the wire outwardly through guides 82 to heads 76. The elements which are mounted on the platform are described in sufficient detail in the Landis Patent No. 2,536,294 and are otherwise well understood in the art. A forwardly extending arm 116 having loops 117 at the outer end thereof supports guides 82 vertically above the flux cones. As a convenience, a vacuum cleaner 113 having a vacuum hose 114 may also be mounted on platform 106 for the purpose of removing excess flux after the welds have been performed.

In operation, the workmen position stands 27 above stiffener 21, which has already been preliminarily tack-welded in place, with legs 28 substantially equidistant from stiffener 21. In order to assist in locating the stands, guide 33 may be employed. Secondary carriage 106 is then rolled along I-beam 23 by means of wheels 108 and rollers 109 until it is a convenient distance from the location of the weld. Welding guides 82 are connected up to heads 76 so that welding rod 77 is ready to be fed to the location of welds 26. The workman then turns adjustment knobs 104 until the center of carraige 43 is exactly over stiffener 21. By turning hand wheel 98, heads 76 are adjusted so that they likewise are properly positioned to perform the weld. By turning handle 71, pinion 64 is disengaged from rack 66 and carriage 43 is located at one end of the weld to be performed. Thereupon the welding machines 111 are started, which passes current through the welding circuit, as well understood in the art, and feeds welding rod 77 from reels 112 to heads 76 as it is consumed. Motor 56 is energized by the same source of current as energizes welding current so that carriage 43 is moved longitudinally of the weld on support 36 at the proper speed, which speed may be adjusted by a rheostat (not shown) in the motor circuit. When carriage 43 reaches the end of the weld, ramp 72 lifts pinion 64 out of engagement with rack 66, thereby stopping advance of the carriage. Thereupon the welding operation is discontinued. The workman uses hose 114 of vacuum cleaner 113 to remove excess flux, and the device is then ready to be transported to the next location.

Although the foregoing invention has been described in some detail by way of illustration and example for purposes of clarity of understanding, it is understood that certain changes and modifications may be practiced within the spirit of the invention and scope of the appended claims.

I claim:

1. In combination, a portable carriage support, legs depending from said carriage support spaced to rest directly upon work to be welded, a carriage movable along said support directly above the welds to be performed on said work, drive means for driving said carriage on said support, a pair of welding heads each disposed in working position to extend downwardly and inwardly toward each other, and suspending means pivotally suspending said welding heads from said carriage, said suspending means being adjustable to adjust the angle of said heads relative to the work, each said welding head having a flux cone, a welding rod extending through said flux cone, and a conductor for electric current connected to said welding rod.

2. In combination, a portable carriage support, legs depending from said carriage support spaced to rest directly upon work to be welded, a carriage movable along said support directly above the welds to be performed on said work, drive means for driving said carriage on said support, a pair of welding heads each disposed in working position to extend downwardly and inwardly toward each other, and suspending means suspending said welding heads from said carriage, said suspending means being adjustable to adjust the angle of said heads relative to the work, means for moving said welding heads transversely relative to the direction of movement of said carriage, each said welding head having a flux cone, a welding rod extending through said flux cone, and a conductor for electric current connected to said welding rod.

3. The combination according to claim 2 in which said drive means comprises a motor on said carriage, a pinion driven by said motor, a horizontal rack extending longitudinally on said support selectively engaged by said pinion, and means for disengaging said pinion from meshing engagement with said rack.

4. In combination, a portable carriage support, legs depending from said carriage support spaced to rest directly upon work to be welded, a carriage movable along said support directly above the welds to be performed on said work, drive means for driving said carriage on said support, a pair of welding heads each disposed in working position to extend downwardly and inwardly toward each other, and suspending means suspending said welding heads from said carriage, said suspending means being adjustable to adjust the angle of said heads relative to the work, means for moving said welding heads transversely relative to the direction of movement of said carriage, each said welding head having a flux cone, a welding rod extending through said flux cone, a conductor for electric current connected to said welding rod, and a tip on the lower end of said cone, said tip being right-angular in shape and adapted to bear against a horizontal surface and a vertical surface.

5. In combination, a pair of portable stands having legs depending from said stands to rest directly on work to be welded and slideways supported by said legs for adjustment of the distance between legs, a carriage support slidably received in said slideways for support in a horizontal position by said stands, a carriage movable along said support, drive means for driving said carriage on said support, a pair of welding heads each disposed in working position to extend downwardly and inwardly toward each other, and suspending means suspending said welding heads from said carriage, said suspending means being adjustable to adjust the angle of said heads relative to the work, each said welding head having a flux cone, a welding rod extending through said flux cone, and a conductor for electric current connected to said welding rod.

References Cited in the file of this patent

UNITED STATES PATENTS

| | | |
|---|---|---|
| 1,612,317 | Reed | Dec. 28, 1926 |
| 1,653,376 | Skelly | Dec. 20, 1927 |
| 1,978,042 | Dodge | Oct. 23, 1934 |
| 2,147,461 | Schroeder | Feb. 14, 1939 |
| 2,357,376 | Baird | Sept. 5, 1944 |
| 2,401,722 | Clapp et al. | June 11, 1946 |
| 2,443,771 | Mallett | June 22, 1948 |
| 2,460,914 | Wright | Feb. 8, 1949 |
| 2,536,294 | Landis et al. | Jan. 2, 1951 |